United States Patent
D'Souza et al.

(10) Patent No.: US 10,352,594 B2
(45) Date of Patent: Jul. 16, 2019

(54) SEALED HEAT EXCHANGE SYSTEM AND AIR CONDITIONER

(71) Applicant: Haier US Appliance Solutions, Inc., Wilmington, DE (US)

(72) Inventors: Bryan Isaac D'Souza, Louisville, KY (US); Timothy Scott Shaffer, La Grange, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 95 days.

(21) Appl. No.: 15/592,255

(22) Filed: May 11, 2017

(65) Prior Publication Data

US 2018/0328629 A1  Nov. 15, 2018

(51) Int. Cl.

| | | |
|---|---|---|
| *F25B 13/00* | (2006.01) | |
| *F25B 49/02* | (2006.01) | |
| *F24F 1/02* | (2019.01) | |
| *F25B 43/00* | (2006.01) | |
| *F25B 41/04* | (2006.01) | |
| *F24F 1/027* | (2019.01) | |
| *F24F 11/77* | (2018.01) | |

(Continued)

(52) U.S. Cl.
CPC .............. *F25B 13/00* (2013.01); *F24D 15/04* (2013.01); *F24F 1/027* (2013.01); *F24F 11/67* (2018.01); *F24F 11/77* (2018.01); *F24F 11/84* (2018.01); *F24F 11/86* (2018.01); *F25B 41/046* (2013.01); *F25B 43/003* (2013.01); *F25B 49/022* (2013.01); *F25B 2313/0293* (2013.01); *F25B 2600/0253* (2013.01); *F25B 2600/2513* (2013.01)

(58) Field of Classification Search
CPC .. F24F 1/027; F24F 11/77; F24F 11/86; F24F 11/67; F25B 13/00; F25B 41/046; F25B 43/003; F25B 49/022; F25B 2313/023; F25B 2600/2513; F25B 2313/0293; F24D 15/04
See application file for complete search history.

(56) References Cited

U.S. PATENT DOCUMENTS

| | | | |
|---|---|---|---|
| 3,299,662 A | | 1/1967 | Harnish |
| 4,171,772 A | * | 10/1979 | Hays ........................ F24D 3/02 237/8 R |

(Continued)

FOREIGN PATENT DOCUMENTS

CN  203478742 U  3/2014

*Primary Examiner* — Melvin Jones
(74) *Attorney, Agent, or Firm* — Dority & Manning, P.A.

(57) ABSTRACT

A sealed heat exchange system and air conditioner are provided herein. The sealed heat exchange system may include a compressor, a heat exchanger, a line filter, a variable electronic expansion device, a primary fluid path, and an alternate fluid path. The compressor may generally increase a pressure of a flowed refrigerant within the sealed heat exchange system. The heat exchanger may be in fluid communication with the compressor and the line filter may be in fluid communication with the heat exchanger. The primary fluid path may define a fluid inlet to receive the flowed refrigerant downstream of the heat exchanger and upstream of the expansion device. The alternate fluid path may define a fluid inlet to receive the flowed refrigerant downstream of the variable electronic expansion device and upstream of the heat exchanger.

20 Claims, 5 Drawing Sheets

(51) Int. Cl.
    *F24F 11/84*    (2018.01)
    *F24F 11/86*    (2018.01)
    *F24F 11/67*    (2018.01)
    *F24D 15/04*    (2006.01)

(56) References Cited

U.S. PATENT DOCUMENTS

| | | | | |
|---|---|---|---|---|
| 4,274,581 | A * | 6/1981 | Hays | F24D 3/18 237/7 |
| 6,082,128 | A | 7/2000 | Lake et al. | |
| 6,094,930 | A | 8/2000 | Zeng et al. | |
| 9,625,184 | B2 * | 4/2017 | Hu | F25B 13/00 |
| 2010/0064703 | A1 * | 3/2010 | Senf, Jr. | F25B 49/025 62/115 |
| 2012/0279236 | A1 | 11/2012 | Douglas et al. | |
| 2013/0098071 | A1 | 4/2013 | Means | |
| 2014/0131599 | A1 * | 5/2014 | Golden | F25B 41/062 251/129.01 |
| 2015/0052914 | A1 | 2/2015 | Leman et al. | |
| 2015/0285539 | A1 * | 10/2015 | Kopko | F25B 5/02 62/115 |
| 2016/0109160 | A1 * | 4/2016 | Junge | F25B 13/00 62/324.6 |

* cited by examiner ized to absorb heat from incoming air before
SEALED HEAT EXCHANGE SYSTEM AND AIR CONDITIONER

FIELD OF THE INVENTION

The present subject matter relates generally to refrigeration systems, and more particularly to sealed cooling systems and air conditioner units.

BACKGROUND OF THE INVENTION

Refrigeration systems are generally utilized adjust the temperature within a certain area. In the case of air conditioner units, one or more units may operate to adjust the temperature within structures such as dwellings and office buildings. In particular, one-unit type room air conditioner units may be utilized to adjust the temperature in, for example, a single room or group of rooms of a structure. Such air conditioner units may include, for instance, a sealed system to cool or heat the room. The sealed system may include a compressor, one or more heat exchangers, and an expansion device.

Conventional systems are often formed from various components that are designed for specific operating conditions. As an example, the components of a conventional sealed system may be generally designed to draw heat from (i.e., cool) air directed therethrough. Thus, the sealed system will optimized to absorb heat from incoming air before directing cooled air away from the sealed system and out of the air conditioner. In some instances, it may be possible to reverse this operation to impart heat to incoming air before directing the heated air away from the sealed system and out of the air conditioner. Although such a system might be alternately used to generate a cooling effect and a heating effect, it is generally not possible to provide an ideal configuration for each effect. For instance, the ideal amount of refrigerant or air flow through or across a specific component may be different for generating a cooling effect than it would be for generating a heating effect. Moreover, in some instances, undesirable particulate, such as contaminates imparted to the compressor during assembly, may flow to various downstream components. Reversing the operation of the sealed system may cause these particulates to flow back into the sealed system, potentially damaging one or more components, such as the compressor itself.

Accordingly, it would be advantageous to provide a sealed heat exchange system, as within an air conditioner, that could be readily optimized for cooling operations and heating operations. Moreover, it would be advantageous to provide such a system without increasing the risk that undesirable particulates may flow back within the system.

BRIEF DESCRIPTION OF THE INVENTION

Aspects and advantages of the invention will be set forth in part in the following description, or may be obvious from the description, or may be learned through practice of the invention.

In one aspect of the present disclosure, a sealed heat exchange system is provided. The sealed heat exchange system may include a compressor, a heat exchanger, a line filter, a variable electronic expansion device, a primary fluid path, and an alternate fluid path. The compressor may be operable to increase a pressure of a flowed refrigerant within the sealed heat exchange system. The heat exchanger may be in fluid communication with the compressor. The line filter may be in fluid communication with the heat exchanger to filter the flowed refrigerant within the sealed heat exchange system. The variable electronic expansion device may be disposed in fluid communication between the heat exchanger and the compressor. The primary fluid path may define a fluid inlet to receive the flowed refrigerant downstream of the heat exchanger and upstream of the expansion device in the first flow direction. The alternate fluid path may define a fluid inlet to receive the flowed refrigerant downstream of the variable electronic expansion device and upstream of the heat exchanger in a second flow direction, the second flow direction being opposite to the first flow direction.

In another aspect of the present disclosure, a packaged terminal air conditioner unit is provided. The packaged terminal air conditioner may include a casing, a compressor, an interior heat exchanger, an exterior heat exchanger, a line filter, a variable electronic expansion device, a primary fluid path, and an alternate fluid path. The compressor may be positioned within the casing. The compressor may be operable to increase a pressure of a flowed refrigerant. The interior heat exchanger may be positioned within the casing in fluid communication with the compressor. The exterior heat exchanger may be positioned within the casing opposite the interior heat exchanger and in fluid communication with the compressor. The line filter may be positioned within the casing in fluid communication with the exterior heat exchanger to filter the flowed refrigerant. The variable electronic expansion device may be positioned within the casing and in fluid communication between the exterior heat exchanger and the interior heat exchanger. The primary fluid path may be positioned within the casing. The primary fluid path may define a fluid inlet to receive the flowed refrigerant downstream of the exterior heat exchanger and upstream of the expansion device in the first flow direction. The alternate fluid path may be positioned within the casing. The alternate fluid path may define a fluid inlet to receive the flowed refrigerant downstream of the variable electronic expansion device and upstream of the exterior heat exchanger in a second flow direction that is opposite to the first flow direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
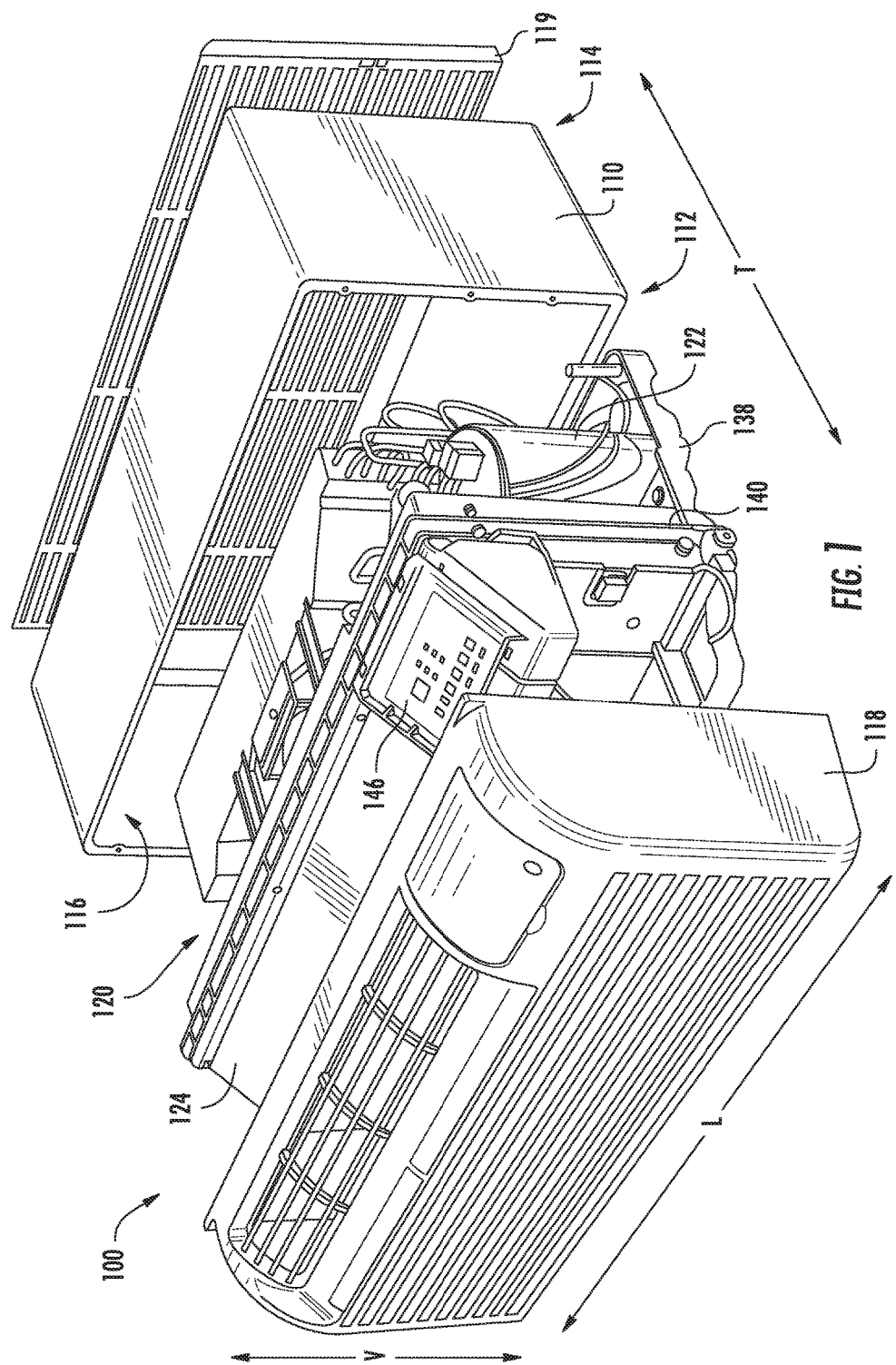
FIG. 1 provides an exploded perspective view of a packaged terminal air conditioner unit according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides an exploded perspective view of a packaged terminal air conditioner unit 100 according to example embodiments of the present disclosure. Generally, packaged terminal air conditioner unit 100 is operable to generate chilled and/or heated air in order to regulate the temperature of an associated room or building. As will be understood by those skilled in the art, packaged terminal air conditioner unit 100 may be utilized in installations where split heat pump systems are inconvenient or impractical. As discussed in greater detail below, a sealed system 120 (i.e., sealed heat exchange system) of packaged terminal air conditioner unit 100 is disposed within a casing 110. Thus, packaged terminal air conditioner unit 100 may be a self-contained or autonomous system for heating and/or cooling air. Packaged terminal air conditioner unit 100 defines a vertical direction V, a lateral direction L, and a transverse direction T that are mutually perpendicular and form an orthogonal direction system.

As used herein, the term "packaged terminal air conditioner unit" is applied broadly. For example, packaged terminal air conditioner unit 100 may include a supplementary electric heater (not shown) for assisting with heating air within the associated room or building without operating the sealed system 120. However, as discussed in greater detail below, packaged terminal air conditioner unit 100 may also include a heat pump heating mode that utilizes sealed system 120, e.g., in combination with an electric resistance heater, to heat air within the associated room or building.

As may be seen in FIG. 1, casing 110 extends between an interior side portion 112 and an exterior side portion 114. Interior side portion 112 of casing 110 and exterior side portion 114 of casing 110 are spaced apart from each other. Thus, interior side portion 112 of casing 110 may be positioned at or contiguous with an interior atmosphere, and exterior side portion 114 of casing 110 may be positioned at or contiguous with an exterior atmosphere. Sealed system 120 includes components for transferring heat between the exterior atmosphere and the interior atmosphere, as discussed in greater detail below.

Casing 110 defines a mechanical compartment 116. Sealed system 120 is disposed or positioned within mechanical compartment 116 of casing 110. A front panel 118 and a rear grill or screen 119 hinder or limit access to mechanical compartment 116 of casing 110. Front panel 118 is positioned at or adjacent interior side portion 112 of casing 110, and rear screen 119 is mounted to casing 110 at exterior side portion 114 of casing 110. Front panel 118 and rear screen 119 each define a plurality of holes that permit air to flow through front panel 118 and rear screen 119, with the holes sized for preventing foreign objects from passing through front panel 118 and rear screen 119 into mechanical compartment 116 of casing 110.

Packaged terminal air conditioner unit 100 also includes a drain pan or bottom tray 138 and an inner wall or bulkhead 140 positioned within mechanical compartment 116 of casing 110. Sealed system 120 is positioned on bottom tray 138. Thus, liquid runoff from sealed system 120 may flow into and collect within bottom tray 138. Bulkhead 140 may be mounted to bottom tray 138 and extend upwardly from bottom tray 138 to a top wall of casing 110. Bulkhead 140 limits or prevents air flow between interior side portion 112 of casing 110 and exterior side portion 114 of casing 110 within mechanical compartment 116 of casing 110. Thus, bulkhead 140 may divide mechanical compartment 116 of casing 110.

Packaged terminal air conditioner unit 100 further includes a controller 146 with user inputs, such as buttons, switches and/or dials. Controller 146 regulates operation of packaged terminal air conditioner unit 100. Thus, controller 146 is operably coupled to various components of packaged terminal air conditioner unit 100, such as components of sealed system 120 and/or a temperature sensor, such as a thermistor or thermocouple, for measuring the temperature of the interior atmosphere. In particular, controller 146 may selectively activate sealed system 120 in order to chill or heat air within sealed system 120, e.g., in response to temperature measurements from the temperature sensor.

In some embodiments, controller 146 includes memory and one or more processing devices. For instance, the processing devices may be microprocessors, CPUs or the like, such as general or special purpose microprocessors operable to execute programming instructions or microcontrol code associated with operation of packaged terminal air conditioner unit 100. The memory can represent random access memory such as DRAM, or read only memory such as ROM or FLASH. The processor executes programming instructions stored in the memory. The memory can be a separate component from the processor or can be included onboard within the processor. Alternatively, controller 146 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Figure 2:
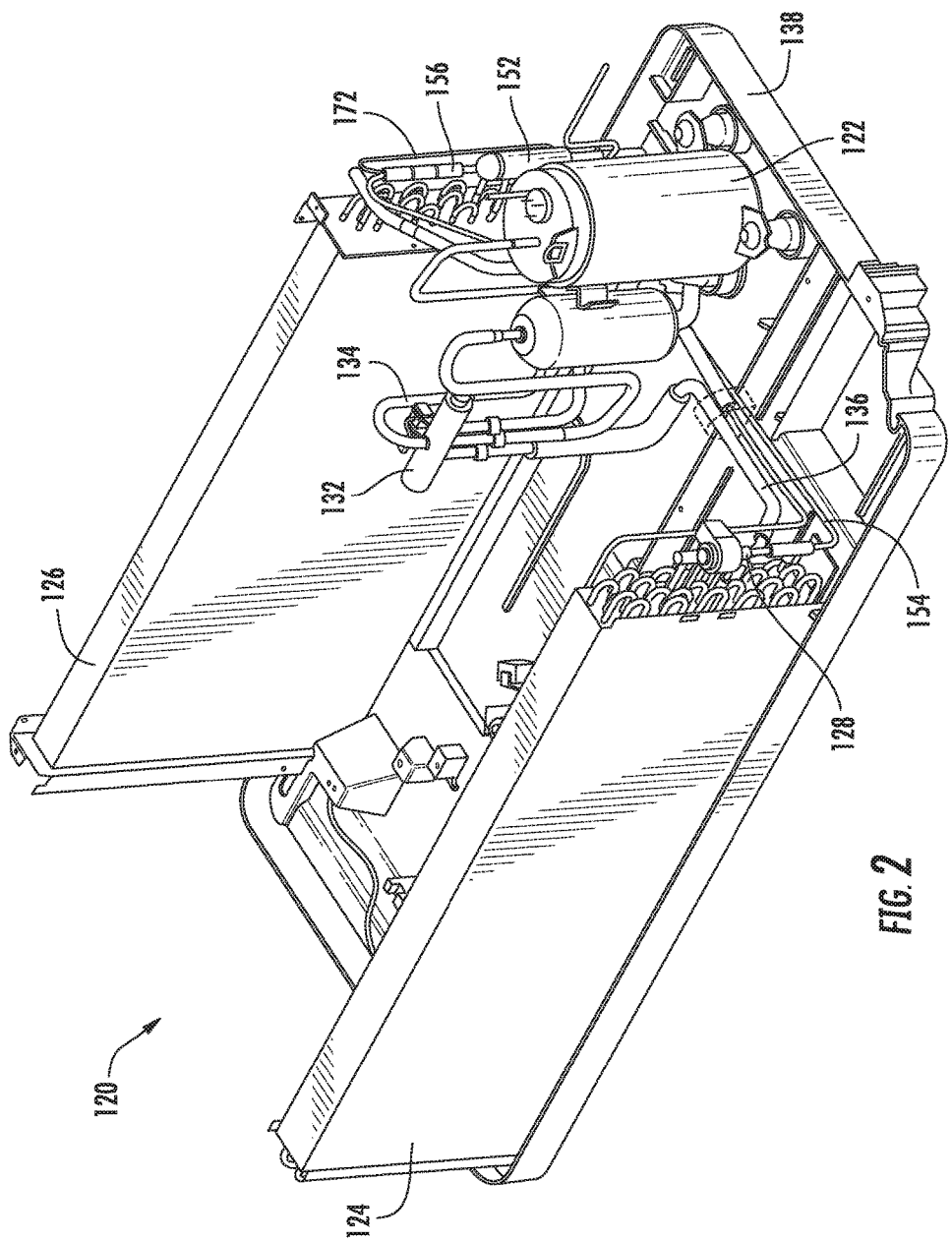
FIG. 2 provides a perspective view of a sealed system of the example packaged terminal air conditioner unit of FIG. 1.
Figure 3:
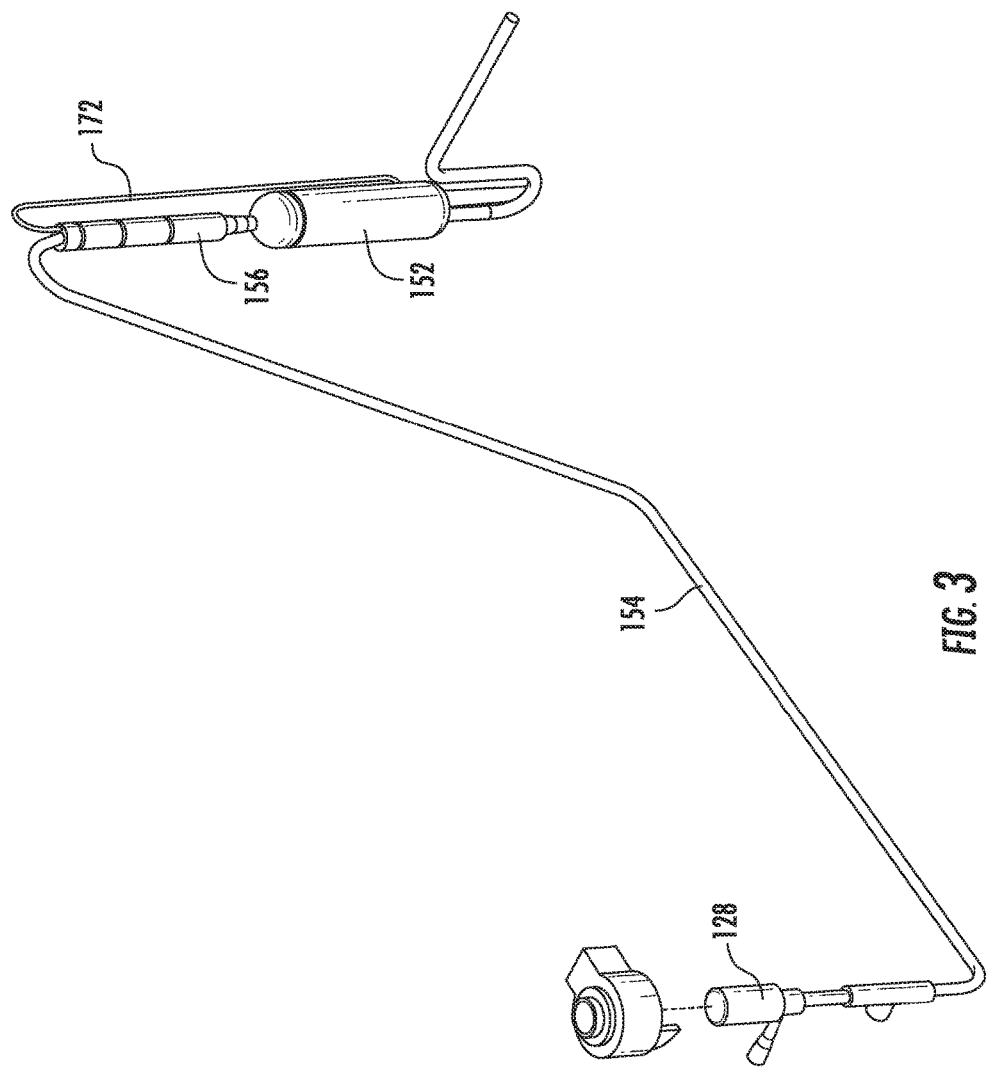
FIG. 3 provides a perspective view of a portion of the example sealed system of FIG. 2.

FIG. 2 provides a perspective view of certain components of packaged terminal air conditioner unit 100, including sealed system 120. FIG. 3 provides a perspective view of a portion of sealed system 120. As shown, sealed system 120 includes a compressor 122, an interior heat exchanger or coil 124 and an exterior heat exchanger or coil 126. As is generally understood, various conduits may be utilized to flow refrigerant between the various components of sealed system 120. Thus, interior coil 124 and exterior coil 126 may be between and in fluid communication with each other and compressor 122.

As will be described in further detail below, sealed cooling system 120 may operate in a cooling mode and, alternately, a heating mode. During operation of sealed system 120 in the cooling mode, refrigerant generally flows from interior coil 124 and to compressor 122. During operation of sealed system 120 in the heating mode, refrigerant generally flows from exterior coil 126 and to compressor 122. In some embodiments, a line filter 152 is provided within sealed system 120 along an intermediate conduit 154, e.g., in fluid communication between the interior coil 124 and the exterior coil 126 to filter the refrigerant during certain operations. A check valve 156 within sealed system 120 may be in fluid communication with line filter 152 (e.g., downstream from line filter 152) while a bypass conduit 172 may direct fluid through the intermediate conduit 154 around the line filter 152. A variable electronic expansion valve 128 may be further provided along the intermediate conduit 154. A compression reversing valve 132 in fluid communication with compressor 122 may control refrigerant flow to and from compressor 122, as well as the coils 124, 126.

Figure 4:
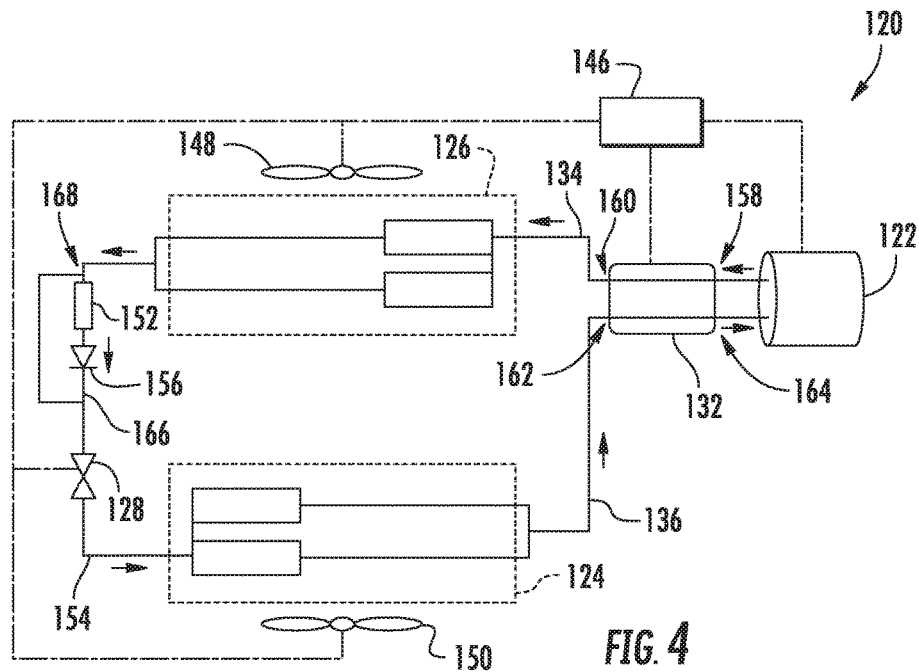
FIG. 4 provides a schematic view of certain components of a sealed system according to example embodiments of the present disclosure, wherein the sealed system is operating in a cooling mode.
Figure 5:
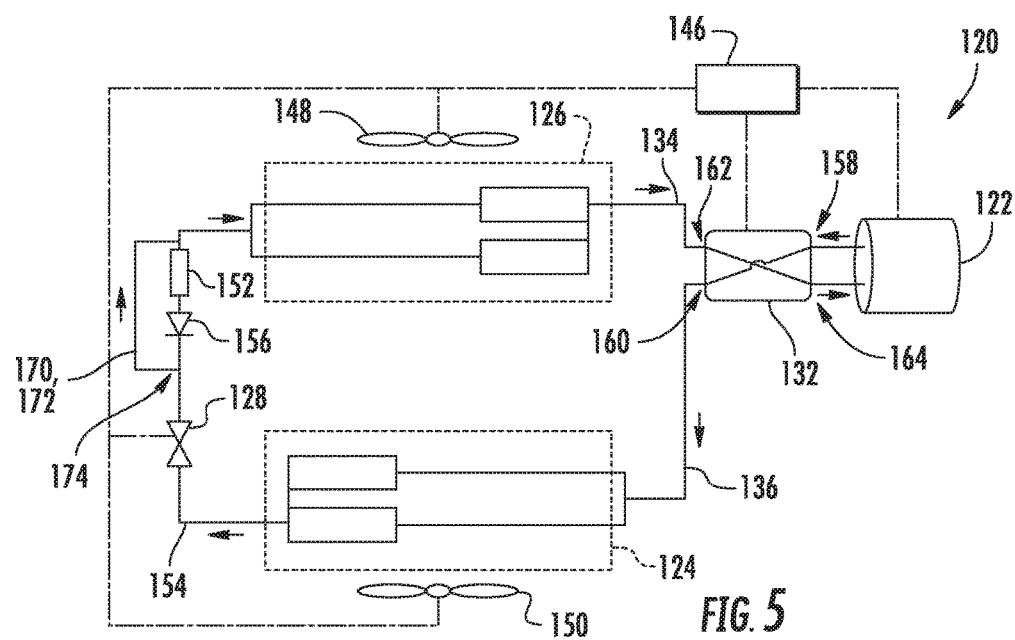
FIG. 5 provides a schematic view of the example sealed system of FIG. 4, wherein the sealed system is operating in a heating mode.

Turning now to FIGS. 4 and 5, schematic views of sealed system 120, as illustrated in FIG. 2, are provided. Specifically, FIG. 4 provides a schematic view of sealed system 120 in a cooling mode, and FIG. 5 provides a schematic view of sealed system 120 in a heating mode. As will be described in detail below, during the cooling mode, refrigerant will generally be flowed in a first flow direction (e.g., from compressor 122 and to exterior coil 126 before interior coil 124). By contrast, during the heating mode, refrigerant will generally be flowed in a second flow direction that is opposite from the first flow direction (e.g., from compressor 122 and to interior coil 124 before exterior coil 126).

As noted above, compressor 122 is operable to increase a pressure of a flowed refrigerant within and flowing through sealed system 120. The compressor 122 may be reversible or, alternatively, configured to compress refrigerant in only a single direction. In some embodiments, sealed system 120 includes a compression reversing valve 132. As shown, compression reversing valve 132 may be disposed across sealed system 120. An initial inlet 158 of compression reversing valve 132 is in fixed fluid communication downstream of compressor 122, and a return outlet 164 is in fixed fluid communication upstream of compressor 122. An initial outlet 160 and return inlet 162 are in selective fluid communication with interior coil 124 and exterior coil 126, e.g., according to an operation mode.

During use, compression reversing valve 132 alternately directs the compressed refrigerant in a first flow direction (FIG. 4) and a second flow direction (FIG. 5). Specifically, compression reversing valve 132 selectively directs compressed refrigerant from compressor 122 to either interior coil 124 or exterior coil 126. For example, in a cooling mode, compression reversing valve 132 is arranged or configured to direct compressed refrigerant from compressor 122 to exterior coil 126. Conversely, in a heating mode, compression reversing valve 132 is arranged or configured to direct compressed refrigerant from compressor 122 to interior coil 124. Thus, compression reversing valve 132 permits sealed system 120 to selectively alternate between the heating mode and the cooling mode.

As shown, compression reversing valve 132 may be operably coupled to controller 146, e.g., as an electronic valve. Controller 146 may thus be further configured to set the flow direction or arrangement of compression reversing valve 132 based on the current mode.

During operation of sealed system 120 in the cooling mode, refrigerant flows from interior coil 124 and to compressor 122. For example, refrigerant may exit interior coil 124 as a fluid in the form of a superheated vapor. Upon exiting interior coil 124, the refrigerant may enter compressor 122, which is operable to compress the refrigerant. Accordingly, the pressure and temperature of the refrigerant may be increased in compressor 122 such that the refrigerant becomes a more superheated vapor.

Exterior coil 126 is disposed downstream of compressor 122 in the cooling mode and acts as a condenser. Thus, exterior coil 126 is operable to reject heat into the exterior atmosphere at exterior side portion 114 of casing 110 when sealed system 120 is operating in the cooling mode. For example, the superheated vapor from compressor 122 may enter exterior coil 126 via a first distribution conduit 134 that extends between and fluidly connects compression reversing valve 132 and exterior coil 126. Within exterior coil 126, the refrigerant from compressor 122 transfers energy to the exterior atmosphere and condenses into a saturated liquid and/or liquid vapor mixture. An exterior air handler or fan 148 is positioned adjacent exterior coil 126 and may facilitate or urge a flow of air from the exterior atmosphere across exterior coil 126 in order to facilitate heat transfer.

As noted above, a line filter 152 is disposed between interior coil 124 and exterior coil 126. Generally, line filter 152 is configured to collect contaminants, such as byproducts from brazing or other manufacturing processes, that may have accumulated within sealed system 120 (e.g., during assembly) and might otherwise damage moving elements (e.g., compressor 122) or restrict small orifices (e.g., at expansion device 128). In turn, line filter 152 may contain or hold a filter to collect contaminates as refrigerant is directed therethrough. Additionally or alternatively, line filter 152 may contain or hold a desiccant material, such as a zeolite molecular sieve, to remove undesired moisture that may be present in sealed system 120. In some embodiments, line filter 152 is a uni-directional filter configured to filter flowed refrigerant in a single direction (e.g., first flow direction).

As shown, line filter 152 may be disposed along a primary fluid path 166 between exterior coil 126 and interior coil 124. In some such embodiments, primary fluid path 166 is along a portion of intermediate conduit 154 to receive flow refrigerant in the cooling mode. Specifically, primary fluid path 166 defines a fluid inlet 168 downstream of exterior coil 126 and upstream of line filter 152 in the cooling mode. During certain operations (e.g., in the cooling mode), fluid inlet 168 may thus receive the flowed refrigerant from exterior coil 126 in the first flow direction before refrigerant is flowed through line filter 152 and to interior coil 124. As noted above, a check valve 156 is further provided along primary fluid path 166 to permit the flow of refrigerant in the first flow direction. Specifically, check valve 156 may be downstream of line filter 152 in the first flow direction. Thus, line filter 152 may be disposed in fluid communication between fluid inlet 168 and check valve 156.

An alternate fluid path 170 is provided to selectively receive flowed refrigerant that is not directed through primary fluid path 166 in the heating mode. For instance, alternate fluid path 170 may be formed along a bypass conduit 172 disposed in parallel to the primary fluid path 166. In some such embodiments, alternate fluid path 170 defines a fluid inlet 174 downstream of interior coil 124 and upstream of exterior coil 126 in the heating mode. During certain operations (e.g., in the heating mode), fluid inlet 174 may thus receive the flowed refrigerant from interior coil 124 in the second flow direction. The check valve 156 may prevent refrigerant from entering the primary flow path 166 such that refrigerant bypasses line filter 152 while being flowed through bypass conduit 172 and to exterior coil 126.

Advantageously, refrigerant within sealed system 120 may only flow in a single direction through line filter 152, regardless of the operation mode. In turn, contaminants collected within filter 152 will be prevented from returning to the refrigerant flow and/or compressor 122.

Variable electronic expansion valve 128 is disposed along intermediate conduit 154 between interior coil 124 and exterior coil 126. During use, variable electronic expansion valve 128 may generally expand the refrigerant, lowering the pressure and temperature thereof. In the cooling mode, refrigerant, which may be in the form of high liquid quality/saturated liquid vapor mixture, may exit primary fluid path 166 and travel through variable electronic expansion valve 128 before flowing through interior coil 124. In the heating mode, refrigerant, may exit interior coil 124 and travel through variable electronic expansion valve 128 before flowing through alternate fluid path 170 and to exterior coil 126.

Variable electronic expansion valve 128 is generally configured to be adjustable. In other words, the flow (e.g., volumetric flow rate in milliliters per second) of refrigerant through variable electronic expansion valve 128 may be selectively varied or adjusted. In some such embodiments, variable electronic expansion valve 128 is operably coupled to controller 146, as shown. Accordingly, controller 146 may be configured to vary the flow of refrigerant based on, for instance, whether sealed system 120 is operating in the cooling mode or heating mode. Advantageously, the expansion of refrigerant may be selectively optimized with multiple operating modes while using only a single expansion device.

Interior coil 124 is disposed downstream of variable electronic expansion valve 128 in the cooling mode and acts as an evaporator. Thus, interior coil 124 is operable to heat refrigerant within interior coil 124 with energy from the interior atmosphere at interior side portion 112 of casing 110 when sealed system 120 is operating in the cooling mode. For example, the liquid or liquid vapor mixture refrigerant from variable electronic expansion valve 128 may enter interior coil 124 via intermediate conduit 154. Within interior coil 124, the refrigerant from variable electronic expansion valve 128 receives energy from the interior atmosphere and vaporizes into superheated vapor and/or high quality vapor mixture. An interior air handler or fan 150 is positioned adjacent interior coil 124 and may facilitate or urge a flow of air from the interior atmosphere across interior coil 124 in order to facilitate heat transfer. From interior coil 124, refrigerant may return to compressor 122 from compression reversing valve 132, e.g., via a second conduit 136 that extends between and fluidly connects interior coil 124 and compression reversing valve 132.

During operation of sealed system 120 in the heating mode, compression reversing valve 132 reverses the direction of refrigerant flow from compressor 122. Thus, in the heating mode, interior coil 124 is disposed downstream of compressor 122 and acts as a condenser, e.g., such that interior coil 124 is operable to reject heat into the interior atmosphere at interior side portion 112 of casing 110. In addition, exterior coil 126 is disposed downstream of variable electronic expansion valve 128 in the heating mode and acts as an evaporator, e.g., such that exterior coil 126 is operable to heat refrigerant within exterior coil 126 with energy from the exterior atmosphere at exterior side portion 114 of casing 110.

One or more components of sealed system may be selectively variable components. In other words, the operating states or speeds of such components may be adjusted according to one or more conditions. In some such embodiments, compressor 122 is a variable speed compressor operably coupled to controller 146. Accordingly, controller 146 may be configured to vary the operating speed (e.g., rotation speed) of compressor 122 based on, for instance, whether sealed system 120 is operating in the cooling mode or heating mode. In turn, the flow (e.g., volumetric flow rate in milliliters per second) of refrigerant from compressor 122 may be varied in magnitude according to the current operational mode. Specifically, a discrete cooling speed and a discrete heating speed may be provided based on, e.g., predetermined testing data indicating heat exchange performance for the respective operating mode. Controller 146 may be programmed or configured to initiate the discrete cooling speed in the first flow direction and the discrete heating speed in the second flow direction. During use of sealed system 120 the absolute volumetric flow rate of refrigerant in the first flow direction may thus be different from the absolute volumetric flow rate of refrigerant in the second flow direction.

In additional or alternative embodiments, one or both of fan 150 and fan 148 may be variable speed fans. Controller 146 may thus be configured to tune or alternate the speed of fan(s) 150, 148 based on whether sealed system 120 is being operated in the cooling mode or heating mode. Discrete cooling speeds and discrete heating speeds may be provided based on, e.g., predetermined testing data indicating heat exchange performance for the respective operating mode. The speeds may generally correspond to rotation speed of the fan(s) 150, 148 (e.g., in revolutions per second) or airflow speed (e.g., as a volumetric flow rate of air across exterior coil 126 or interior coil 124). Thus, the speed at which fan(s) 150, 148 blows ambient air across the respective exterior coil 126 or interior coil 124 when refrigerants flows in the first flow direction may be different from the speed at which fan(s) 150, 148 blows air when refrigerants flows in the second flow direction.

Figure 6:
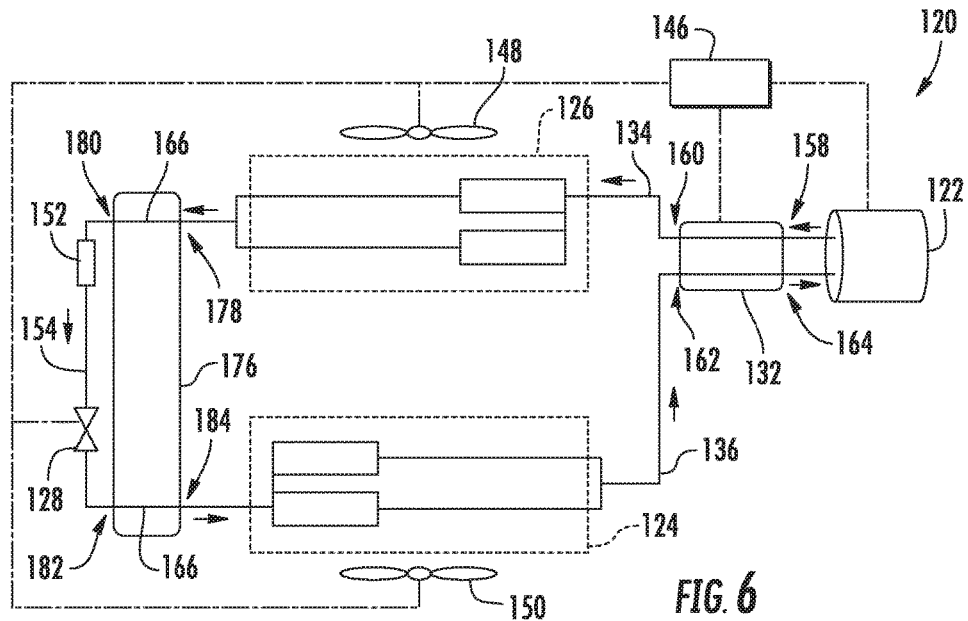
FIG. 6 provides a schematic view of certain components of a sealed system according to other example embodiments of the present disclosure, wherein the sealed system is operating in a cooling mode.
Figure 7:
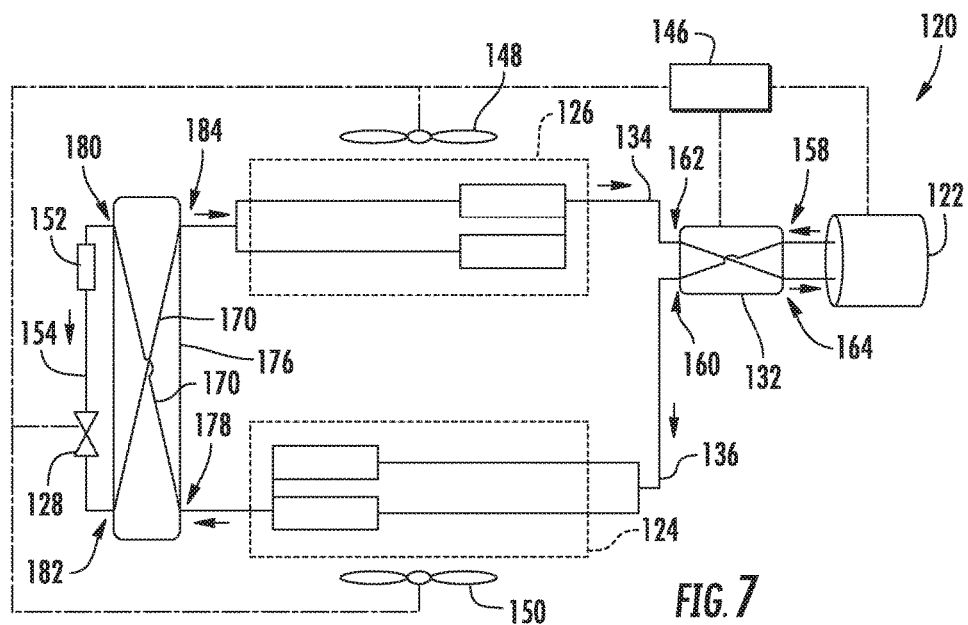
FIG. 7 provides a schematic view of the example sealed system of FIG. 6, wherein the sealed system is operating in a heating mode.

Turning now to FIGS. 6 and 7, schematic views of sealed system 120 according to alternative embodiments are provided. Specifically, FIG. 6 provides a schematic view of a sealed system 120 in a cooling mode, and FIG. 7 provides a schematic view of sealed system 120 in a heating mode. It is understood that, except as otherwise indicated, the embodiments of FIGS. 6 and 7 may be considered substantially similar to the embodiments of FIGS. 4 and 5. Moreover, it is understood that, to the extent that they differ, the embodiments of FIGS. 6 and 7 may be altered to include one or more features of the embodiments of FIGS. 4 and 5, and vice versa.

As will be described in detail below, during the cooling mode, refrigerant will generally be flowed in a first flow direction (e.g., from compressor 122 and to exterior coil 126 before interior coil 124). By contrast, during the heating mode, refrigerant will generally be flowed in a second flow direction that is opposite from the first flow direction (e.g., from compressor 122 and to interior coil 124 before exterior coil 126).

As noted above, compressor 122 is operable to increase a pressure of a flowed refrigerant within and flowing through sealed system 120. The compressor 122 may be reversible or, alternatively, configured to compress refrigerant in only a single direction. In some embodiments, sealed system 120 includes a compression reversing valve 132. As shown, compression reversing valve 132 may be disposed across sealed system 120. An initial inlet 158 of compression reversing valve 132 is in fixed fluid communication downstream of compressor 122, and a return outlet 164 is in fixed fluid communication upstream of compressor 122. An initial outlet 160 and return inlet 162 are in selective fluid communication with interior coil 124 and exterior coil 126, e.g., according to an operation mode.

During use, compression reversing valve 132 alternately directs the compressed refrigerant in a first flow direction (FIG. 6) and a second flow direction (FIG. 7). Specifically, compression reversing valve 132 selectively directs compressed refrigerant from compressor 122 to either interior coil 124 or exterior coil 126. For example, in a cooling mode, compression reversing valve 132 is arranged or configured to direct compressed refrigerant from compressor 122 to exterior coil 126. Conversely, in a heating mode, compression reversing valve 132 is arranged or configured to direct compressed refrigerant from compressor 122 to interior coil 124. Thus, compression reversing valve 132 permits sealed system 120 to selectively alternate between the heating mode and the cooling mode.

As shown, compression reversing valve 132 may be operably coupled to controller 146, e.g., as an electronic valve. Controller 146 may thus be further configured to set the flow direction or arrangement of compression reversing valve 132 based on the current mode.

During operation of sealed system 120 in the cooling mode, refrigerant flows from interior coil 124 and to compressor 122. For example, refrigerant may exit interior coil 124 as a fluid in the form of a superheated vapor. Upon exiting interior coil 124, the refrigerant may enter compressor 122. Compressor 122 is operable to compress the refrigerant. Accordingly, the pressure and temperature of the refrigerant may be increased in compressor 122 such that the refrigerant becomes a more superheated vapor.

Exterior coil 126 is disposed downstream of compressor 122 in the cooling mode and acts as a condenser. Thus, exterior coil 126 is operable to reject heat into the exterior atmosphere at exterior side portion 114 of casing 110 when sealed system 120 is operating in the cooling mode. For example, the superheated vapor from compressor 122 may enter exterior coil 126 via a first distribution conduit 134 that extends between and fluidly connects compression reversing valve 132 and exterior coil 126. Within exterior coil 126, the refrigerant from compressor 122 transfers energy to the exterior atmosphere and condenses into a saturated liquid and/or liquid vapor mixture. An exterior air handler or fan 148 is positioned adjacent exterior coil 126 and may facilitate or urge a flow of air from the exterior atmosphere across exterior coil 126 in order to facilitate heat transfer.

As noted above, a line filter 152 is disposed between interior coil 124 and exterior coil 126. Generally, line filter 152 is configured to collect contaminants, such as byproducts from brazing or other manufacturing processes, that may have accumulated within sealed system 120 (e.g., during assembly) and might otherwise damage moving elements (e.g., compressor 122) or restrict small orifices (e.g., at expansion device 128). In turn, line filter 152 may contain or hold a filter particulate to collect contaminates as refrigerant is directed therethrough. Additionally or alternatively, line filter 152 may contain or hold a desiccant material, such as a zeolite molecular sieve, to remove undesired moisture that may be present in sealed system 120. In some embodiments, line filter 152 is a uni-directional filter configured to filter flowed refrigerant in a single direction (e.g., first flow direction).

In some embodiments, line filter 152 is disposed along an intermediate conduit 154 between exterior coil 126 and interior coil 124. Variable electronic expansion valve 128 may be disposed along intermediate conduit 154 downstream from line filter 152. During use, variable electronic expansion valve 128 may generally expand the refrigerant, lowering the pressure and temperature thereof.

Variable electronic expansion valve 128 is generally configured to be adjustable. In other words, the flow (e.g., volumetric flow rate in milliliters per second) of refrigerant through variable electronic expansion valve 128 may be selectively varied or adjusted. In some such embodiments, variable electronic expansion valve 128 is operably coupled to controller 146, as shown. Accordingly, controller 146 may be configured to vary the flow of refrigerant based on, for instance, whether sealed system 120 is operating in the cooling mode or heating mode. Advantageously, the expansion of refrigerant may be selectively optimized with multiple operating modes while using only a single expansion device.

In some embodiments, an expansion reversing valve 176 is disposed across sealed system 120. As shown, expansion reversing valve 176 may define a primary fluid path 166 (FIG. 6) and an alternate fluid path 170 (FIG. 7). Primary fluid path 166 generally defines a fluid inlet (e.g., initial inlet 178) downstream from exterior coil 126 in a first flow direction, and alternate fluid path 170 generally defines a fluid inlet (e.g., initial inlet 178) downstream of interior coil 124 in a second flow direction. Moreover, expansion reversing valve 176 includes an initial outlet 180 in fixed fluid communication upstream of line filter 152 and a return inlet 182 in fixed fluid communication downstream of variable electronic expansion valve 128. As will be described in detail below, initial inlet 178 and return outlet 184 are in selective fluid communication with interior coil 124 and exterior coil 126.

During use, expansion reversing valve 176 alternately directs the compressed refrigerant in the first flow direction through primary fluid path 166 (FIG. 6) and the second flow direction through alternate fluid path 170 (FIG. 7). Specifically, expansion reversing valve 176 selectively directs refrigerant either from interior coil 124 to interior coil 126 or from exterior coil 126 to interior coil 124. For example, in the cooling mode, expansion reversing valve 176 is arranged or configured to direct refrigerant from exterior coil 126 to interior coil 124 across primary fluid path 166. Conversely, in the heating mode, expansion reversing valve 176 is arranged or configured to direct refrigerant from interior coil 124 to exterior coil 126 across alternate fluid path 170. Thus, expansion reversing valve 176 further permits sealed system 120 to adjust between the heating mode and the cooling mode.

As shown, expansion reversing valve 176 may be operably coupled to controller 146, e.g., as an electronic valve. Controller 146 may thus be further configured to set the flow arrangement of expansion reversing valve 176 based on the current mode. In the cooling mode, refrigerant, which may be in the form of high liquid quality/saturated liquid vapor mixture, may exit primary fluid path 166 and travel through variable electronic expansion valve 128 before flowing through interior coil 124. In the heating mode, refrigerant, may exit interior coil 124 and travel through variable electronic expansion valve 128 before flowing through alternate fluid path 170 and to exterior coil 126. Advantageously, refrigerant within sealed system 120 may only flow in a single direction through line filter 152, regardless of the operation mode. In turn, contaminants collected within filter 152 will be prevented from returning to the refrigerant flow and/or compressor 122.

Interior coil 124 is disposed downstream of variable electronic expansion valve 128 in the cooling mode and acts as an evaporator. Thus, interior coil 124 is operable to heat refrigerant within interior coil 124 with energy from the interior atmosphere at interior side portion 112 of casing 110 when sealed system 120 is operating in the cooling mode. For example, the liquid or liquid vapor mixture refrigerant from variable electronic expansion valve 128 may enter interior coil 124 via a portion of primary fluid path 166 between variable electronic expansion valve 128 and interior coil 124. Within interior coil 124, the refrigerant from variable electronic expansion valve 128 receives energy from the interior atmosphere and vaporizes into superheated vapor and/or high quality vapor mixture. An interior air handler or fan 150 is positioned adjacent interior coil 124 may facilitate or urge a flow of air from the interior atmosphere across interior coil 124 in order to facilitate heat transfer. From interior coil 124, refrigerant may return to compressor 122 from compression reversing valve 132, e.g., via a second conduit 136 that extends between and fluidly connects interior coil 124 and compression reversing valve 132.

During operation of sealed system 120 in the heating mode, compression reversing valve 132 reverses the direction of refrigerant flow from compressor 122 while expansion reversing valve 176 reverse the direction of refrigerant flow between coils 124, 126. Thus, in the heating mode, interior coil 124 is disposed downstream of compressor 122 and acts as a condenser, e.g., such that interior coil 124 is operable to reject heat into the interior atmosphere at interior side portion 112 of casing 110. In addition, exterior coil 126 is disposed downstream of variable electronic expansion valve 128 in the heating mode and acts as an evaporator, e.g., such that exterior coil 126 is operable to heat refrigerant within exterior coil 126 with energy from the exterior atmosphere at exterior side portion 114 of casing 110.

One or more components of sealed system may be selectively variable components. In other words, the operating states or speeds of such components may be adjusted according to one or more conditions. In some such embodiments, compressor 122 is a variable speed compressor operably coupled to controller 146. Accordingly, controller 146 may be configured to vary the operating speed (e.g., rotation speed) of compressor 122 based on, for instance, whether sealed system 120 is operating in the cooling mode or heating mode. In turn, the flow (e.g., volumetric flow rate in milliliters per second) of refrigerant from compressor 122 may be varied in magnitude according to the current operational mode. Specifically, a discrete cooling speed and a discrete heating speed may be provided based on, e.g., predetermined testing data indicating heat exchange performance for the respective operating mode. Controller 146 may be programmed or configured to initiate the discrete cooling speed in the first flow direction and the discrete heating speed in the second flow direction. During use of sealed system 120 the absolute volumetric flow rate of refrigerant in the first flow direction may thus be different from the absolute volumetric flow rate of refrigerant in the second flow direction.

In additional or alternative embodiments, one or both of fan 150 and fan 148 may be variable speed fans. Controller 146 may thus be configured to tune or alternate the speed of fan(s) 150, 148 based on whether sealed system 120 is being operated in the cooling mode or heating mode. Discrete cooling speeds and discrete heating speeds may be provided based on, e.g., predetermined testing data indicating heat exchange performance for the respective operating mode. The speeds may generally correspond to rotation speed of the fan(s) 150, 148 (e.g., in revolutions per second) or airflow speed (e.g., as a volumetric flow rate of air across exterior coil 126 or interior coil 124). Thus, the speed at which fan(s) 150, 148 blows ambient air across the respective exterior coil 126 or interior coil 124 when refrigerants flows in the first flow direction may be different from the speed at which fan(s) 150, 148 blows air when refrigerants flows in the second flow direction.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A sealed heat exchange system comprising:
 a compressor operable to increase a pressure of a flowed refrigerant within the sealed heat exchange system;
 a heat exchanger in fluid communication with the compressor;
 a line filter in fluid communication with the heat exchanger to filter the flowed refrigerant within the sealed heat exchange system;
 a variable electronic expansion device disposed in fluid communication between the heat exchanger and the compressor;
 a primary fluid path defining a fluid inlet to receive the flowed refrigerant downstream of the heat exchanger and upstream of the expansion device in the first flow direction; and
 an alternate fluid path defining a fluid inlet to receive the flowed refrigerant downstream of the variable electronic expansion device and upstream of the heat exchanger in a second flow direction, the second flow direction being opposite to the first flow direction,
 wherein the alternate fluid path is formed along a bypass conduit disposed in parallel to the primary fluid path.

2. The sealed heat exchange system of claim 1, further comprising a controller operably coupled to the variable electronic expansion device, and wherein the controller is configured to adjust the variable electronic expansion device alternately according to the first flow direction and the second flow direction.

3. The sealed heat exchange system of claim 1, wherein the compressor is a variable speed compressor, and wherein the sealed heat exchange system further comprises a controller operably coupled to the variable speed compressor, and wherein the controller is configured to adjust the variable speed compressor alternately according to the first flow direction and the second flow direction.

4. The sealed heat exchange system of claim 1, further comprising a variable speed fan directed toward the heat exchanger to selectively blow an ambient airflow across the heat exchanger, wherein the sealed heat exchange system further comprises a controller operably coupled to the variable speed fan, and wherein the controller is configured to adjust the variable speed fan alternately according to the first flow direction and the second flow direction.

5. The sealed heat exchange system of claim 1, further comprising a check valve disposed along the primary fluid path to direct the flowed refrigerant in the first flow direction, wherein the line filter is disposed along the primary fluid path downstream from the fluid inlet of the primary fluid path and upstream from the check valve.

6. The sealed heat exchange system of claim 1, further comprising an expansion reversing valve disposed across the sealed heat exchange system to alternately direct the flowed refrigerant from the heat exchanger in the first flow direction and to the heat exchanger in the second flow direction, wherein the expansion reversing valve defines an initial outlet in fixed fluid communication upstream of the filter and a return inlet in fixed fluid communication downstream of the electronic expansion device.

7. The sealed heat exchange system of claim 1, further comprising a compression reversing valve disposed across the sealed heat exchange system to alternately direct the flowed refrigerant to the heat exchanger in the first flow direction and from the heat exchanger in the second flow direction, wherein the compression reversing valve defines an initial inlet in fixed fluid communication downstream of the compressor and a return outlet in fixed fluid communication upstream of the compressor.

8. The sealed heat exchange system of claim 1, wherein the heat exchanger is a first heat exchanger disposed downstream from the compressor and upstream of the variable expansion device in the first flow direction, and wherein the sealed heat exchange system further comprises a second heat exchanger disposed upstream from the compressor and downstream of the variable expansion device in the first flow direction.

9. A packaged terminal air conditioner unit, comprising:
a casing;
a compressor positioned within the casing, the compressor operable to increase a pressure of a flowed refrigerant;
an interior heat exchanger positioned within the casing in fluid communication with the compressor;
an exterior heat exchanger positioned within the casing opposite the interior heat exchanger and in fluid communication with the compressor;
a line filter positioned within the casing in fluid communication with the exterior heat exchanger to filter the flowed refrigerant;
a variable electronic expansion device positioned within the casing and in fluid communication between the exterior heat exchanger and the interior heat exchanger;
a primary fluid path positioned within the casing, the primary fluid path defining a fluid inlet to receive the flowed refrigerant downstream of the exterior heat exchanger and upstream of the expansion device in the first flow direction; and
an alternate fluid path positioned within the casing, the alternate fluid path defining a fluid inlet to receive the flowed refrigerant downstream of the variable electronic expansion device and upstream of the exterior heat exchanger in a second flow direction, the second flow direction being opposite to the first flow direction, wherein the alternate fluid path is formed along a bypass conduit disposed in parallel to the primary fluid path.

10. The packaged terminal air conditioner unit of claim 9, further comprising a controller operably coupled to the variable electronic expansion device, and wherein the controller is configured to adjust the variable electronic expansion device alternately according to the first flow direction and the second flow direction.

11. The packaged terminal air conditioner unit of claim 9, wherein the compressor is a variable speed compressor, wherein the packaged terminal air conditioner further comprises a controller operably coupled to the variable speed compressor, and wherein the controller is configured to adjust the variable speed compressor alternately according to the first flow direction and the second flow direction.

12. The packaged terminal air conditioner unit of claim 9, further comprising a variable speed fan directed toward the exterior heat exchanger to selectively blow an ambient airflow across the exterior heat exchanger, wherein the packaged terminal air conditioner further comprises a controller operably coupled to the variable speed fan, and wherein the controller is configured to adjust the variable speed fan alternately according to the first flow direction and the second flow direction.

13. The packaged terminal air conditioner unit of claim 9, further comprising a check valve disposed along the primary fluid path to direct the flowed refrigerant in the first flow direction, wherein the line filter is disposed along the primary fluid path downstream from the fluid inlet of the primary fluid path and upstream from the check valve.

14. The packaged terminal air conditioner unit of claim 9, further comprising an expansion reversing valve disposed across the sealed heat exchange system to alternately direct the flowed refrigerant from the exterior heat exchanger in the first flow direction and to the exterior heat exchanger in the second flow direction, wherein the expansion reversing valve defines an initial outlet in fixed fluid communication upstream of the filter and a return inlet in fixed fluid communication downstream of the electronic expansion device.

15. The packaged terminal air conditioner unit of claim 9, further comprising a compression reversing valve disposed across the sealed heat exchange system to alternately direct the flowed refrigerant to the exterior heat exchanger in the first flow direction and from the exterior heat exchanger in the second flow direction, wherein the compression reversing valve defines an initial inlet in fixed fluid communication downstream of the compressor and a return outlet in fixed fluid communication upstream of the compressor.

16. A sealed heat exchange system comprising:
a compressor operable to increase a pressure of a flowed refrigerant within the sealed heat exchange system;
a heat exchanger in fluid communication with the compressor;
a line filter in fluid communication with the heat exchanger to filter the flowed refrigerant within the sealed heat exchange system;
a variable electronic expansion device disposed in fluid communication between the heat exchanger and the compressor;
a primary fluid path defining a fluid inlet to receive the flowed refrigerant downstream of the heat exchanger and upstream of the expansion device in the first flow direction;
an alternate fluid path defining a fluid inlet to receive the flowed refrigerant downstream of the variable electronic expansion device and upstream of the heat exchanger in a second flow direction, the second flow direction being opposite to the first flow direction; and
a compression reversing valve disposed across the sealed heat exchange system to alternately direct the flowed refrigerant to the exterior heat exchanger in the first flow direction and from the exterior heat exchanger in the second flow direction.

17. The sealed heat exchange system of claim 16, wherein the compression reversing valve defines an initial inlet in fixed fluid communication downstream of the compressor and a return outlet in fixed fluid communication upstream of the compressor.

18. The sealed heat exchange system of claim 16, wherein the expansion reversing valve defines an initial outlet in fixed fluid communication upstream of the filter and a return inlet in fixed fluid communication downstream of the electronic expansion device.

19. The sealed heat exchange system of claim 16, wherein the compressor is a variable speed compressor, and wherein the sealed heat exchange system further comprises a controller operably coupled to the variable speed compressor, and wherein the controller is configured to adjust the variable speed compressor alternately according to the first flow direction and the second flow direction.

20. The sealed heat exchange system of claim 16, further comprising a variable speed fan directed toward the heat exchanger to selectively blow an ambient airflow across the heat exchanger, wherein the sealed heat exchange system further comprises a controller operably coupled to the variable speed fan, and wherein the controller is configured to adjust the variable speed fan alternately according to the first flow direction and the second flow direction.

* * * * *